United States Patent
Fisher et al.

(10) Patent No.: US 7,478,728 B2
(45) Date of Patent: Jan. 20, 2009

(54) SCREEN SYSTEM

(75) Inventors: George Willox Fisher, Aberdeenshire (GB); Marshall Graham Bailey, Aberdeen (GB)

(73) Assignee: Axiom Process Limited (GB)

( * ) Notice: Subject to any disclaimer, the term of this patent is extended or adjusted under 35 U.S.C. 154(b) by 331 days.

(21) Appl. No.: 10/545,098

(22) PCT Filed: Jan. 20, 2004

(86) PCT No.: PCT/GB2004/000150

§ 371 (c)(1),
(2), (4) Date: Aug. 8, 2005

(87) PCT Pub. No.: WO2004/069374

PCT Pub. Date: Aug. 19, 2004

(65) Prior Publication Data

US 2006/0163121 A1     Jul. 27, 2006

(30) Foreign Application Priority Data

Feb. 8, 2003  (GB) .................................. 0302927.9

(51) Int. Cl.
*B07B 1/49* (2006.01)
(52) U.S. Cl. .................. 209/399; 209/319; 209/403; 209/405; 209/409
(58) Field of Classification Search ................ 209/319, 209/399, 403, 405, 409
See application file for complete search history.

(56) References Cited

U.S. PATENT DOCUMENTS 2,283,878 A    5/1942  Heller
3,256,992 A    6/1966  Eiling (Continued)

FOREIGN PATENT DOCUMENTS

CH         404 369         12/1965

(Continued)

*Primary Examiner*—Patrick H Mackey
*Assistant Examiner*—Terrell H Matthews
(74) *Attorney, Agent, or Firm*—Gifford, Krass, Sprinkle, Anderson & Citkowski, P.C.

(57) ABSTRACT

A screen system 8 suitable for use in a vibratory screen apparatus 1, comprising: a screen element 11 consisting essentially of a mesh panel 19 provided with first and second elongate support members 22, 23 extending along opposite end portions 20, 21; and a support frame 12 therefore. The support frame 12 has spaced apart first and second elongate frame elements 13, 14 for engagement with said screen element support members 22, 23 and further elongate frame elements 17, 18 extending between the first and second frame elements 13, 14 for supporting the mesh panel 19. The support frame 12 is provided with at least one mesh panel support 27 provided with an elevating support surface, which tensions the screen element 11 across the support surface 27 and between the screen element support members 22, 23. The latter 22, 23 and the first and second frame elements 13, 14 are being formed and arranged for secure interengagement. At least one of the screen element support members 22, 23 and the respective one of the first and second frame elements 13, 14 is formed and arranged so that when the screen element 19 is tensioned by the mesh panel support 27 with the support surface thereof elevated, the mesh panel 19 is securely held under tension and the screen element support members 22, 23 are driven into securely gripped interengagement with the frame elements 13, 14.

19 Claims, 5 Drawing Sheets

U.S. PATENT DOCUMENTS

| | | | |
|---|---|---|---|
| 3,666,095 A * | 5/1972 | Krynock et al. | 209/254 |
| 3,968,033 A * | 7/1976 | Illemann et al. | 209/403 |
| 4,040,951 A | 8/1977 | Cole | |
| 4,582,597 A * | 4/1986 | Huber | 209/313 |
| 7,216,768 B2 * | 5/2007 | Fisher et al. | 209/395 |

FOREIGN PATENT DOCUMENTS

| | | |
|---|---|---|
| FR | 738989 | 1/1933 |
| GB | 554679 | 4/1943 |
| GB | 2 176 425 | 12/1986 |
| GB | 2 266 475 | 11/1993 |
| WO | WO 03/013690 | 2/2003 |

* cited by examiner

SCREEN SYSTEM

FIELD OF THE INVENTION

The present invention relates to screen systems for use in vibratory screen apparatus suitable for use in liquid solid separation and classification including inter alia, the sifting of drilling mud, cuttings and like material derived from oil-well drilling.

BACKGROUND OF THE INVENTION

Conventional vibratory apparatus for sifting mud and like material in the oil industry generally utilise screens of either hook strip or pretensioned design. Hook strip screens generally consist of single or multiple layers of mesh bonded together, which are tensioned after mounting in the basket of the vibratory screen apparatus. Two opposed ends of the screen are fitted with a turn back element to form a hook strip which is hooked around a tension rail, the latter being attached to the side wall of the basket, typically via a tension bolt, though other loading means to apply tensioning and securing forces may be employed. Tightening the tension bolt moves the tension rail outwardly, towards the walls of the basket, thus applying tension to the screen. The screen is normally stretched over a crowned deck, giving an arcuate profile to the screen, so that rigidity of the screen is retained during vibratory motion.

Hook strip screens may be pretensioned prior to mounting in the basket by attachment of the screen mesh element to an apertured support plate—typically by means of an adhesive. Where a plurality of mesh layers is used, these would normally be pretensioned. In some designs, layers of fused mesh may be corrugated prior to mounting to an apertured support plate and the hooks applied thereafter to the mesh-plate combination.

Hook strip screens have a number of disadvantages including the complex and time consuming mounting of the screen members in the basket, which results in significant downtime of the vibratory screen apparatus and requires the use of multiple parts. Attaining the correct screen tension for the material to be sieved also involves intricate fine tuning and the screens are easily damaged if too much force is applied when tightening the bolts or loading means to tension the screens. A further disadvantage is the relatively poor sealing between the screen and basket. The metal on metal seal often results in leakage with unscreened material passing through gaps between the screen and the basket, and mixing with already screened material below the mesh screen. Attempts to overcome the poor seal by placing rubber strips or gaskets at the metal/metal interfaces have proved unsatisfactory. These require intricate and time consuming fitting and frequently work loose during vibration and become lost or lodged in the vibratory machine, obstructing and damaging the machinery. In addition applying tension to the screen when tightening the tension bolt or loading means gives rise to additional stresses over and above those already suffered by the machine framework due to the vibratory motion, thereby possibly resulting in deterioration of the framework.

Pretensioned screens generally comprise one or more layers of mesh permanently bonded under tension onto a generally rigid steel and/or plastics material apertured plate support frame. The mesh screen may be flat, or crowned. The screen and frame is inserted into the basket as a unit, requiring no adjustment to the tension of the screen. The screen and frame unit is normally secured in the machine by clamping it from above or below by, but not restricted to, hydraulic pistons, inflatable clamping bags, bolts, or tapered elements.

Conventional pretensioned screen units with integral support frames have significant disadvantages being bulky, heavy and difficult to handle, transport and store; all very major considerations for use on off shore installations where all of these are at a very high premium. The design is complex and the frames expensive to construct. Typically plastic injection moulding is used which is an inflexible method of construction. The frames utilise large amounts of material all of which require disposal when the screen units are replaced, which is both inconvenient and expensive and has a negative impact on the environment.

Attempts to address some of these problems have been made (GB 2245191) by using a filter screen assembly comprising a main frame of moulded plastics material, subdivided by cross pieces which secure a stretched screen mesh. When a sub area of mesh is damaged it may be plugged with a module, snap fitted in place of the mesh. These screen assemblies, however, are very complex in structure with many of the disadvantages and associated expense of conventional pretensioned screens and, in addition, the inconvenience, storage and additional material requirements of the modules.

A further problem that arises with known screen systems is that due to the extra weight of the material being processed which is concentrated, in use of screening apparatus at the back (upstream) end thereof. The screen mesh in that area is subjected to particularly heavy wear resulting in the frequent need for replacement thereof. This problem has previously been addressed by using coarser heavy duty mesh in that area, but this inevitably results in reduced screening performance of the screening apparatus.

It is an object of the present invention to avoid or minimize one or more of the above disadvantages.

SUMMARY OF THE INVENTION

In one aspect the present invention provides a screen system suitable for use in a vibratory screen apparatus, said screen system comprising:

a screen element consisting essentially of a mesh panel provided with first and second elongate support members extending along opposite end portions of said mesh panel; and a support frame for said screen element, said support frame having spaced apart first and second elongate frame elements for engagement with said screen element support members in use of the screen system, and further elongate frame elements extending between said first and second frame elements for supporting said mesh panel of said screen element; said support frame being provided with at least one mesh panel support provided with an elevating support surface, and formed and arranged so that elevation of said elevating support surface, tensions said screen element across said support surface and between said screen element support members, said screen element support members and said first and second frame elements being formed and arranged for secure interengagement in use of the screen system, with at least one of said screen element support members and the respective one of said first and second frame elements being formed and arranged so that when said screen element is tensioned by said mesh panel support with said support surface thereof elevated, in use of the screen system, said mesh panel is securely held under tension and said screen element support members driven into securely gripped interengagement with said frame elements.

It will be appreciated that the screen element support members could have a substantially unitary form, or could be in the form of an assembly. In the former case there could, for example, be used a first mesh engaging or anchoring, support member portion bonded to a second, gripping support member portion by means of adhesive and/or by welding or otherwise fusing together. In the latter case there could, for example, be used a said first support member portion which is captively interengaged with and/or secured to a said second support member portion using mechanical fastener means such as screws, staples, rivets etc.

Preferably both first and second support members and the respective elongate frame elements are formed and arranged for maximising gripping security when they are driven into interengagement with each other by the tensioning force applied to the mesh panel of the screen element by the elevation of the mesh panel support elevating surface. Where only one of the first and second support members and the respective elongate frame element is formed and arranged for secure interengagement when driven into interengagement as described above, the other may utilise any convenient form of secure interengagement such as one or more hook elements captively engaging in a hook engaging element such as a loop, recess, aperture or the like. It will be appreciated moreover that the hook element(s) may have various different forms such as for example a mushroom shape which can be captively engaged in a keyhole aperture etc.

Various forms of mesh panel support may be used in accordance with the present invention. In general there would be used a plurality, preferably a multiplicity, of elongate mesh panel support members, spaced apart across the support frame. Preferably there is used a multiplicity of elongate mesh panel support members, extending transversely of the support frame parallel to said first and second elongate frame elements. Another possible arrangement is to have a multiplicity of mesh panel support members extending parallel to the further frame elements, though this is generally less preferred as it is more difficult to tension the mesh panel evenly with such an arrangement.

Various forms of mechanism may be used to elevate the elevating surfaces of the elongate mesh panel support members, such as screw jack devices, camming devices, lever devices, pressurised fluid lift devices, etc. Most conveniently though there is used an elevating device in the form of an expandable fluid filled tube connectable, in use, to a pressurised fluid source, for example a hydraulic fluid pump or a compressed gas source, whereby introduction of the pressurised fluid will expand the tube so as to raise an elevating support surface provided thereon.

One particularly suitable form of mesh panel support member comprises a collapsible tube filled with pressurized fluid such as compressed air or a liquid such as water or hydraulic fluid as described in more detail in Patent Publications GB2176424A and GB2176425A.

It will be appreciated that the elevating surface may be simply constituted by a more or less flexible wall portion of the fluid filled tube on which the mesh panel is supported. Alternatively there may be used a tube with a more rigid wall portion on which the mesh panel is supported, or a force transfer plate mounted on the tube. Such a force transfer plate would preferably be more or less rigid, and could be provided, if desired, with a mesh panel support surface lining which is resiliently deformable to a limited extent so as to minimise local stresses etc. on the mesh panel and minimise relative movement between the mesh panel and the mesh panel support in use of the vibratory screen apparatus.

In accordance with the present invention, the screen element support member(s) and respective one(s) of the first and second frame elements may be formed and arranged so that when the former is (are) driven into interengagement with the latter by the tensioning of the mesh panel of the screen element, the screen element and the support frame form together a securely interengaged stand-alone screen system unit. In a preferred form of the invention though, the screen element support member(s) and respective one(s) of the first and second frame elements, and screen system support runners provided in the vibratory screen apparatus, are formed and arranged so that when the mesh panel is tensioned by the mesh panel support members, the screen element support member(s) is driven into interengagement with both the respective one(s) of the first and second frame elements and the screen support runners, whereby the secure interengagement of the screen element support member(s) and frame element(s) is dependent upon and achieved simultaneously with, the securing of the screen system in the apparatus on said runners. It will be appreciated that this arrangement avoids the need for a separate securing system, for securing the screen system in the vibratory screen apparatus, thereby considerably simplifying mounting and de-mounting of screen elements.

It will be understood that the mesh panels may be pretensioned by being secured onto apertured support plates, or may rely on the tensioning forces applied via the support member(s). In the former case it will further be appreciated that part of the support plate may be used to constitute at least one of the first and second screen element support members. Thus, for example, an elongate end portion of the support plate could be cranked into a hook form and/or provided with hook or other elements for interengagement with suitable hook engaging elements or the like on the respective one of the first and second frame elements.

It will be appreciated that the function of the apertured support plates is essentially to support the mesh of the mesh panel with as little interference as practicable with the screening function of the mesh—by minimizing occlusion thereof. Thus in the general context of the screen elements of the invention it should be understood that references to "mesh panels" herein, includes mesh panels in the form of mesh secured to any such apertured support panels unless the context specifically requires otherwise.

It will also be appreciated that the mesh panel extending between said first and second support members may be in a form of a single continuous area of mesh, or could be made up of a plurality of mesh panel sections interconnected along their adjoining edges by any suitable means such as stitching, bonding, or by releasable interengagement of suitable connectors, for example, ones similar to the hook element type of support member described above. This can be advantageous in order to facilitate handling and installation of the screen elements to the support frames.

It will further be appreciated that the mesh panelling in a screen system of the invention, or even within an individual screen element, could be made up of mesh panels of a uniform mesh aperture size and/or shape or, if desired, mesh panels of different mesh size and/or shape could be used. It will also be understood that individual mesh panels could have a uniform mesh aperture size and/or shape or could have a plurality of different mesh aperture sizes and/or shapes, for example, a progression of increasing mesh aperture size from one part to another of the mesh panel. Conveniently mesh panels of variable mesh aperture size could be made by varying the inter-weft and/or inter-warp spacing along or across the weave of a woven mesh panel.

In the case of pretensioned mesh panels supported on apertured support plates, the apertured support plates could have a uniform aperture size or, if desired, there could be used support plates with apertures of two or more different aperture sizes, for example a series of apertures of progressively increasing aperture size. It will also be understood that, where two or more screen elements are mounted on a single support frame, each of the respective support plates could have a different apertures size and/or shape. Thus individual support plates could have a uniform aperture size and/or shape or could have a plurality of different aperture sizes and/or shapes, for example, a progression of increasing aperture size from one part to another of the plate. It should also be appreciated that where an apertured support plate is used, the mesh secured thereto need not necessarily be pretensioned.

Conveniently mesh panels of variable mesh aperture size could be made by varying the inter-weft and/or inter-warp spacing along or across the weave of a woven mesh panel.

Thus with a screen system of the present invention, there may be used a screen element of particularly simple and economical construction which can be treated as disposable, whilst providing the necessary rigidity and support therefor, in use of the screen system, by means of a said support frame which can readily be reused with successive replacement screen elements. In principle it would be possible to replace just the mesh panel of a screen element of the invention but this is generally less convenient.

The screen system of the present invention can be readily used in existing screen vibratory machinery (of hook-strip and pretensioned design) with clamping systems generally known in the art, with little or no modification, thereby enabling users of existing systems readily to bring it into use at minimal cost.

It will also be appreciated that the support frame could include additional elongate frame elements and/or further frame elements disposed between said first and second frame elements and further frame elements, in order to provide additional support to the screen mesh panel.

Where a plurality of screen elements is supported on a single support frame—which normally remains in place in the screening apparatus when the screen elements are replaced, the screen elements are advantageously provided with readily releasable interengagement elements such as hooks and apertures, for connecting the screen elements together in order to facilitate insertion and withdrawal of the screen elements into and from the screening apparatus. Having regard also to the fact that the support frames are usually recessed to a greater or lesser degree within the screening apparatus, the support frame is advantageously provided at a proximal end portion thereof with a guide device formed and arranged so that when a screen element is inserted into the screening apparatus it is guided up and over the proximal end of the support frame to avoid fouling thereof.

The support frame is generally used to support a single screen element. If desired, though, a single support frame could be formed and arranged so as to support a plurality of screen elements disposed generally side by side, abutting or cascading across said support frame, supported by additional (intermediate) frame elements between the elongate first and second frame elements. Said screen elements may be secured to such intermediate or interior support frame elements by means of hooks, pins. Alternatively, as described hereinbefore, a single support frame may be used to support a (single) screen element made up of a plurality of releasably interconnected mesh panel sections, without the need for such intermediate support frame elements.

Preferably the further frame elements extending (transversely) between said first and second frame elements, which support said screen mesh panel when said screen system is secured to the support frame, have convexly arcuate support surfaces to form a crown deck, as is customary in the vibratory screen apparatus art, so that the supported screen mesh panel adopts a generally part-cylindrical or part elliptical-section form.

It will be appreciated that the support frame may be of any suitable material known in the vibratory screen apparatus art including but not limited to plastics such as glass reinforced polyester and/or polyethylene, polypropylene, polyamide etc. or a blend thereof, metal such as galvanised steel or advantageously stainless steel.

As noted above, the mesh panel may be in the form of a plain mesh, or alternatively in a pre-tensioned form in which a mesh is secured e.g. by means of adhesive or fusing, onto or into an apertured lightweight flexible support plate, or plastic coating thereon etc. The apertured support plate may be of any suitable material including metal, plastics material, or glass or carbon fibre reinforced plastics, although preferably there is used plastics coated metal, especially plastics coated steel. Conveniently the apertured support plate is manufactured by means of punching suitably sized apertures in the support plate, especially using computer controlled punching apparatus. This has the advantage of affording particular flexibility in relation to the production of support plates with various different aperture sizes (whether within the same support plate or in different support plates). Various other techniques well known in the art can also be used for forming the apertures, such as for example, laser cutting. Also in the case of support plates made of plastics materials, especially fibre and/or wire reinforced plastics materials, the apertures are conveniently formed by producing the apertured support plates by means of techniques such as injection moulding.

With support plates formed of punched metal, it should be noted that the punching process can introduce a degree of bowing into the plate. Given that the mesh is normally attached to the "smooth" side of the punched plate which is also the concave side of the bowed plate, and indeed pretensioned mesh can itself impart a degree of bowing to the plate when it is secured to the support plate, it is then necessary to apply force to the plate so as to reverse the bowing therein, so that it can be mounted onto a support frame with convex further frame elements across which the mesh panel of the screen element is supported. Advantageously therefore such a bowed plate would be subjected to a process such as rolling so as to take out or reverse to a greater or lesser extent any undesirable bowing, prior to securing the suitably tensioned mesh thereto. By avoiding in this way any bowing in the screen elements which differs substantially from that of the support frame further elements, not only is installation and removal of the screen elements facilitated, but also the clamping force is more efficiently utilized.

In addition it will be understood that the mesh panel could comprise a single mesh layer or a plurality of superposed mesh layers which are held together onto said first and second elongate support members.

The or each mesh panel may be of any suitable form known in the vibratory screen apparatus art depending on the material being screened and other screening conditions. Typically there may be used mesh panels with mesh screen sizes in the range from 10 to 400 (wires per inch)—corresponding to mesh aperture diameters of around 2.5 mm to 0.03 mm. The mesh panels are generally fabricated from metal wire, typically of a suitable metal such as stainless steel, phosphor bronze, etc.

In a still further aspect the present invention provides a method of mounting a screen element of the present invention in a vibratory screen apparatus which has a basket provided with screen system support runners formed and arranged for sliding insertion and removal of a screen system of the present invention comprising a said screen element and a support frame therefor, wherein said support runners are formed and arranged for interengagement with the screen support members, said method comprising the steps of inserting a said screen element into said basket so as to be supported on a said support frame in said support runners; and elevating said mesh panel support surface so as tension said screen element, thereby driving said screen element support members so as to grip said screen element securely together with said support frame in said support runners.

Various kinds of runner may be used including support runners in the form of various male and/or female formations on or in the basket sides providing runner surfaces for generally captively supporting the screen element supporting members and support frame first and second frame elements. Thus, for example, there could be used a support runner in the form of a (female) channel or a pair of parallel (male) flanges. Advantageously the lower runner surfaces of the opposed runners are downwardly inclined towards each other so that when correspondingly inclined engagement surfaces at the underside of the support frame seat thereon, the support frame is automatically centralised in the runner supports of the screening apparatus.

In another aspect the present invention provides a vibratory screen apparatus provided with a screen system of the present invention.

In yet another aspect the present invention provides a method of screening a fluidised particulate material suspended in a liquid medium, comprising the steps of providing a vibratory screen apparatus with a screen system of the present invention; mounting the screen element and screen element support frame in an at least one basket of said apparatus so as to be gripped together to said basket; activating a vibratory unit of said vibratory screen apparatus: and feeding said fluidised particulate material onto an upper surface of said screen element.

BRIEF DESCRIPTION OF THE DRAWINGS

Further preferred features and advantages of the invention will appear from the following detailed description given by way of example of some preferred embodiments illustrated with reference to the accompanying drawings in which.

DETAILED DESCRIPTION OF THE PREFERRED EMBODIMENTS

Figure 1:
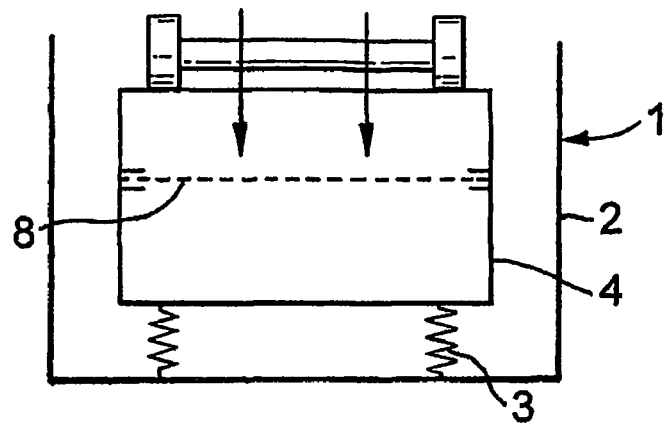
FIG. 1 is a schematic elevation of a vibratory screen apparatus provided with a screen system of the present invention.

FIG. 1 shows schematically a vibratory screen apparatus 1 with an outer housing 2 in which is mounted on springs 3 a basket unit 4. Each basket 5 of the basket unit 4 (see also FIG. 2) is generally box shaped with a pair of circumferentially extending inwardly projecting flanges 6 at an intermediate height on the basket walls 7, for supporting a screen system of the invention 8 as typically found in existing pretension screen vibratory machinery. A vibrator unit 9 is secured to the top 10 of the basket unit 4. FIG. 4 shows a screen system 8 comprising a screen element 11 clamped to a support frame 12 (also shown in FIG. 3) between the basket flanges 6.

The support frame 12 comprises first and second elongate frame elements 13, 14 at opposite end portions 15, 16 and further elongate, third and fourth, frame elements 17, 18 interconnecting them.

As shown in FIG. 4 the screen element 11 comprises a mesh panel 19 having cranked opposite end portions 20, 21 anchored in first and second elongate screen support members 22, 23. The screen support members 22, 23 are of generally wedge shaped section with an upper outwardly upwardly inclined screen system support runner flange engaging face 24 and a first or second frame element engaging face 25 outwardly downwardly inclined at an angle of about 45° thereto (and thus inclined to the generally horizontally extending principal plane of the screen element), for engagement with a correspondingly inclined support face 26 of the first or second frame element 13, 14.

The support frame 12 with the screen element 11 positioned thereon, is supported at each end portion 15, 16 on a lower one 6a of the respective flanges 6. A series of mesh panel supports in the form of inflatable tubes 27 is secured 28 to the further frame elements 17 so that when the tubes 27 are filled with pressurised fluid, they press upwardly against the mesh panel 9 elevating it slightly so as to exert a tensioning force onto the screen element support members 22 so as to drive them like wedges in between respective first or second frame elements 13, 14 and the respective upper screen system support runner flanges 6b. In this way the screen element 11 is gripped to the support frame 12, and the screen system 8 comprised thereby is gripped securely to the basket 5.

Figure 3:
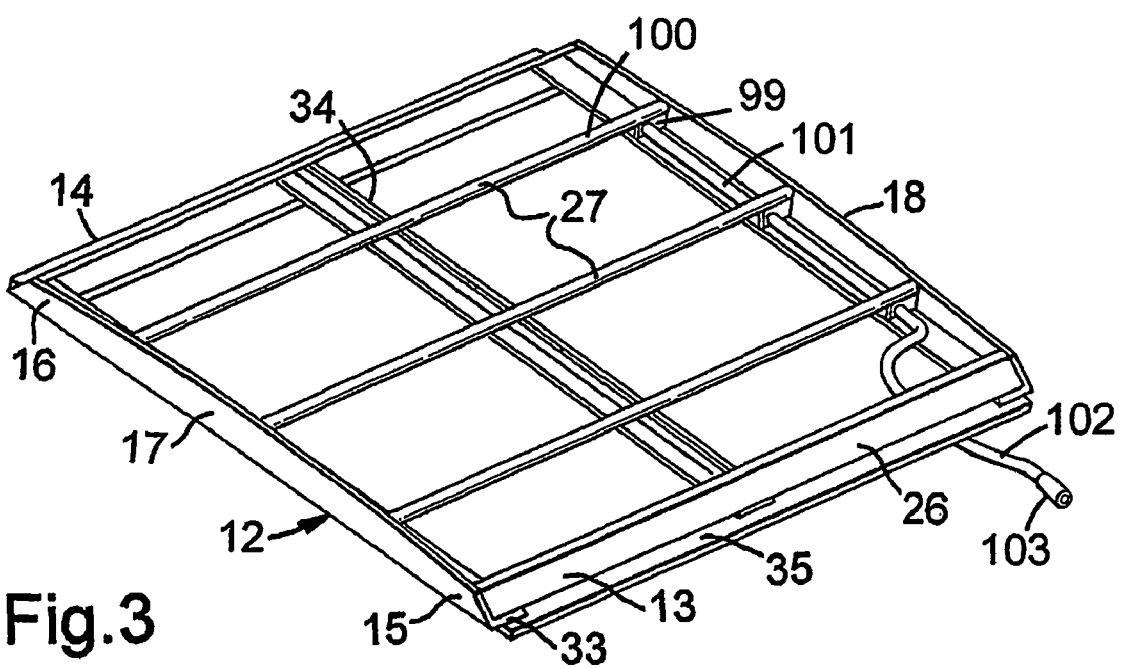
FIG. 3 is a perspective view of the support frame of the screen system of the apparatus of FIGS. 1 and 2.
Figure 4:
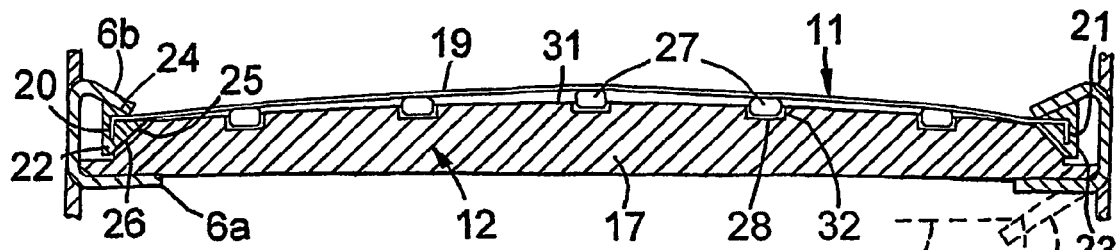
FIG. 4 is a detail sectional elevation of the apparatus of FIGS. 1 and 2 showing mounting of the screen system.

As may be seen in FIGS. 3 and 4 the further frame elements 17,18 of the support frame 12 have convexly arcuate upper edges 31 to form a so-called crown deck across which the screen mesh panel 19—supported on the tubes 27—is stretched, so as to increase the rigidity and dimensional stability of the mesh panel 19 in use thereof during the vibratory screening process.

As may also be seen in FIG. 3, the further frame elements 17 and 18 are in the form of angle sections 33 to impart greater rigidity to the support frame 12, which is further enhanced by various additional bracing and support elements 34, 35. The inflatable mesh panel support tubes 27 are conveniently supported in channels 32 (see FIG. 4).

Figure 2:
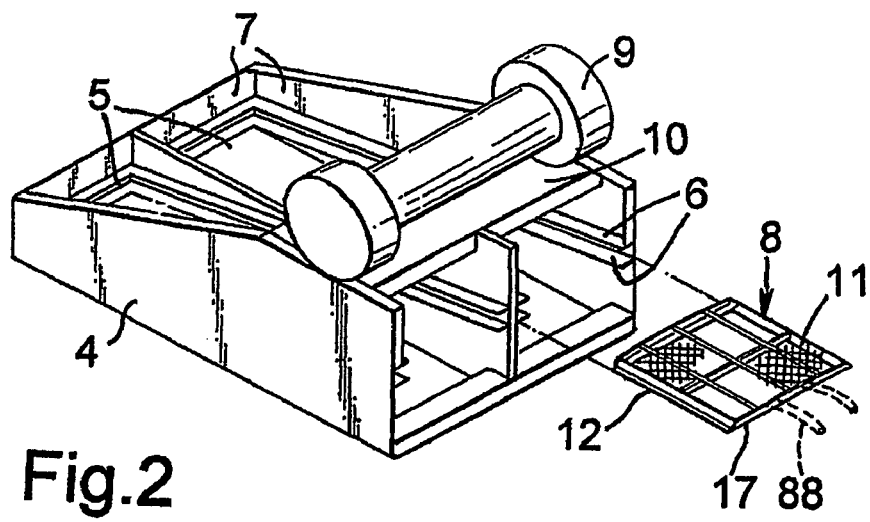
FIG. 2 is a perspective view of the principal parts of the apparatus of FIG. 1.

As may be seen from FIG. 2, each basket 5 is formed and arranged to mount therein a plurality of screen systems 8 (only one shown). When a screen element 11 needs to be replaced the mesh panel support tube 27 can be simply deflated and the screen system 8 withdrawn, the screen element 11 removed from the support frame 12, and a new screen element 11 put in its place, whereupon the thus restored screen system 8 can be reinstalled and gripped in into place.

As it is only necessary to replace the screen element when the mesh panel is damaged in use, or, for example, in order to use a screen element with a different mesh aperture size, the screen system of the present invention is economically beneficial and convenient. In addition less material is required for screen system manufacture; storage space requirements, packaging requirements and transport costs of the screens are reduced; and the reduced volume of discarded screen components for disposal has a reduced impact on the environment.

Figure 6:
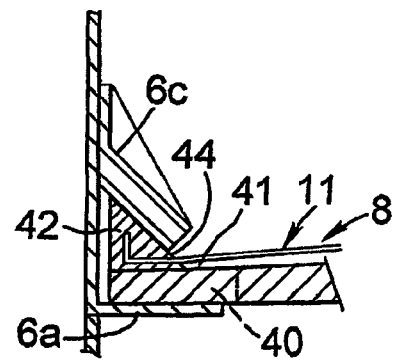
FIGS. 6 and 7 are detail views corresponding generally to FIGS. 4 and 5 illustrating a second embodiment of the invention.
Figure 7:
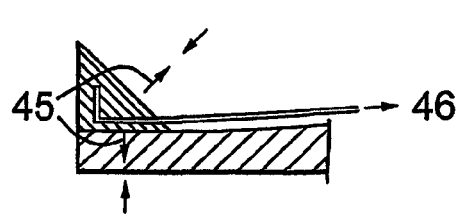

FIG. 6 shows a modified embodiment of screen system and gripping arrangement in which like parts corresponding to those in the first embodiment are indicated by like reference numerals. In this case the support frame 12 has first and second frame elements 40 with a horizontal support face 41 upon which a wedge-section support member 42 of the screen element 11 is supported. In this case the support member 42 has a lower horizontal, frame element engaging, face 43 and an upper screen system support runner flange engaging face 44 inclined upwardly outwardly of the screen element 11. The gripping and screen tensioning force components 45, 46 are shown in FIG. 7.

Figure 8:
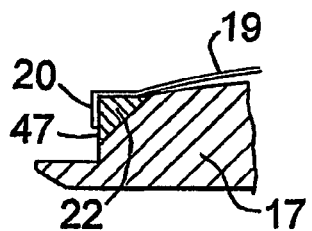
FIGS. 8 and 9 are detail views corresponding generally to FIG. 4 illustrating third and fourth embodiments of the invention.

FIG. 8 shows a further modified embodiment similar to that of FIGS. 1 to 5, in which the cranked end portions 20 of the screen mesh panel 19 instead of being anchored in slots within the support members 22, 23 are hooked over the vertically extending outer face 47 of the wedge-section support member 22—said end portions 20 being made sufficiently rigid to maintain their configuration when the screen mesh panel 19 is fully tensioned. In this case the screen mesh panel 19 may be just lightly bonded e.g. with suitable adhesive to the support member 22, or could just rely entirely on the clamping together of the screen mesh panel 19, support members 22, 23 and support frame 12, components of the screen system, when mounted in a basket 5, to retain the screen mesh panel 19 to the support members 22, 23.

Figure 5:
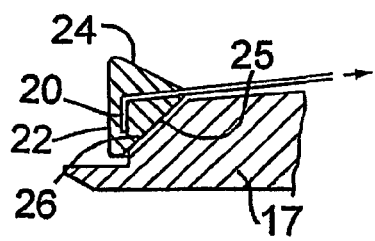
FIG. 5 is a detail view of one end of the screen system of FIG. 4 illustrating the screen tensioning and gripping forces.
Figure 9:
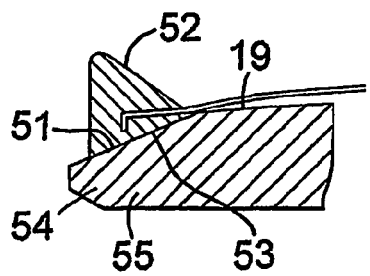

FIG. 9 illustrates another embodiment, generally similar to that of FIGS. 4 and 5, in which there is used a support member 51 having a generally wedge shaped profile with an upper side 52 providing an upwardly outwardly inclined upper runner flange engaging face and a lower inclined side 53. The support member 51 is supported on an inclined face 54 provided on a respective first or second frame element 55.

Figure 10:
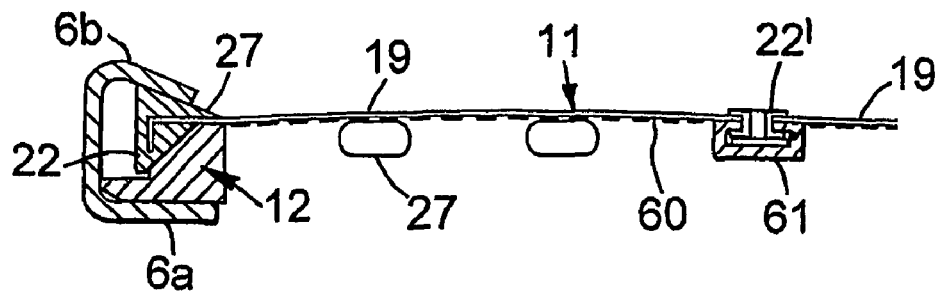
FIGS. 10 and 11 are detail cross sectional views of fifth and sixth embodiments of multi-mesh panel screen systems of the invention.

FIG. 10 shows an embodiment of the present invention where the screen system comprises a plurality of interengaged-screen elements at least one of which has a screen support member 22 gripped and secured to an elongated frame element 3 of a support frame 12 between support flanges 6a and 6b of a vibratory screening apparatus basket as described in FIG. 4. The mesh panels 19 of the screen element comprise one or more mesh layers secured to an apertured plate 60 at least two of which have second screen support member 22. The second screen support member 22 has an elongated hook for capture engagement in a hook engaging recess 61 of an elongate frame element of said support frame to interengage and secure said screen element to said support frame.

Figure 11:
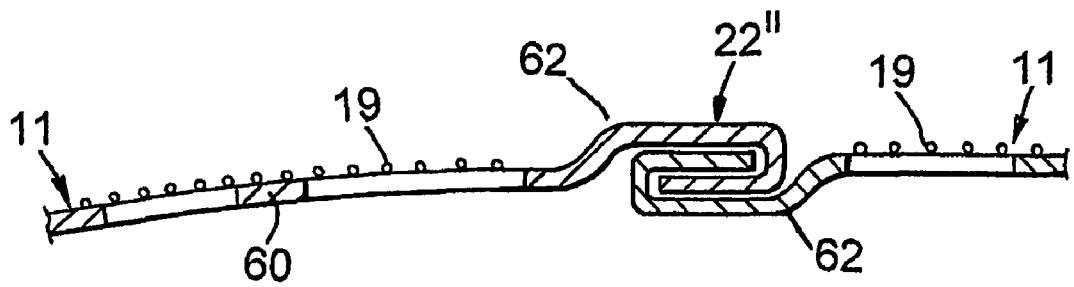

FIG. 11 is a detail sectional view showing an example of a means for interconnection of two mesh panels 19 of the present invention. (The other ends of the mesh panels not shown in the figure could be in the form of any of the various support members shown in FIGS. 4 to 9. The other end of such a mesh panel 19 could also be in the form of a further mesh panel interconnection means for use in a case where a serial array of 3 or more mesh panels is provided between two support members).

In more detail FIG. 11 shows end portions 62 of two mesh panels 19 having support members hook sections 22. The hook sections 22 are formed and arranged so as to maintain the mesh panels 19 in secure interengagement with each other when the screen element 11 is tensioned across the support frame 12.

Figure 12:
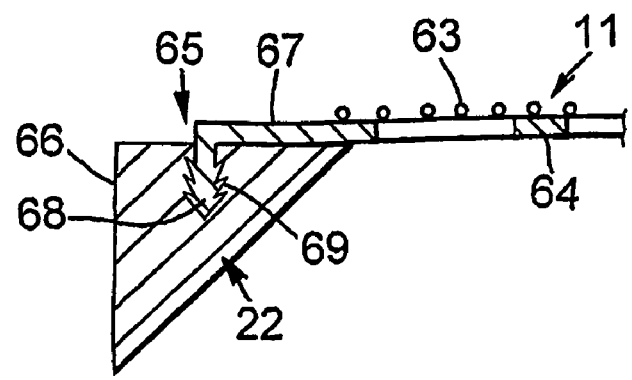
FIG. 12 is a detail view of one end of a seventh embodiment of a screen element of the invention.

FIG. 12 shows part of another embodiment of a screen element 11 in which a mesh panel 19 comprising a wire screen mesh 63 bonded to an apertured support plate 64 is anchored 65 to a screen support member body 66. In more detail the end 67 of the apertured plate 64 is cranked downwardly and provided with ratchet tooth formations 68 for push fit locking interengagement in a generally complementary slot 69 in the screen support member body 66, said cranked end 67 effectively constituting a support member anchorage portion, which combines together with the support member body 66 to form together therewith, a support member 22 for the mesh panel 19.

Figure 13:
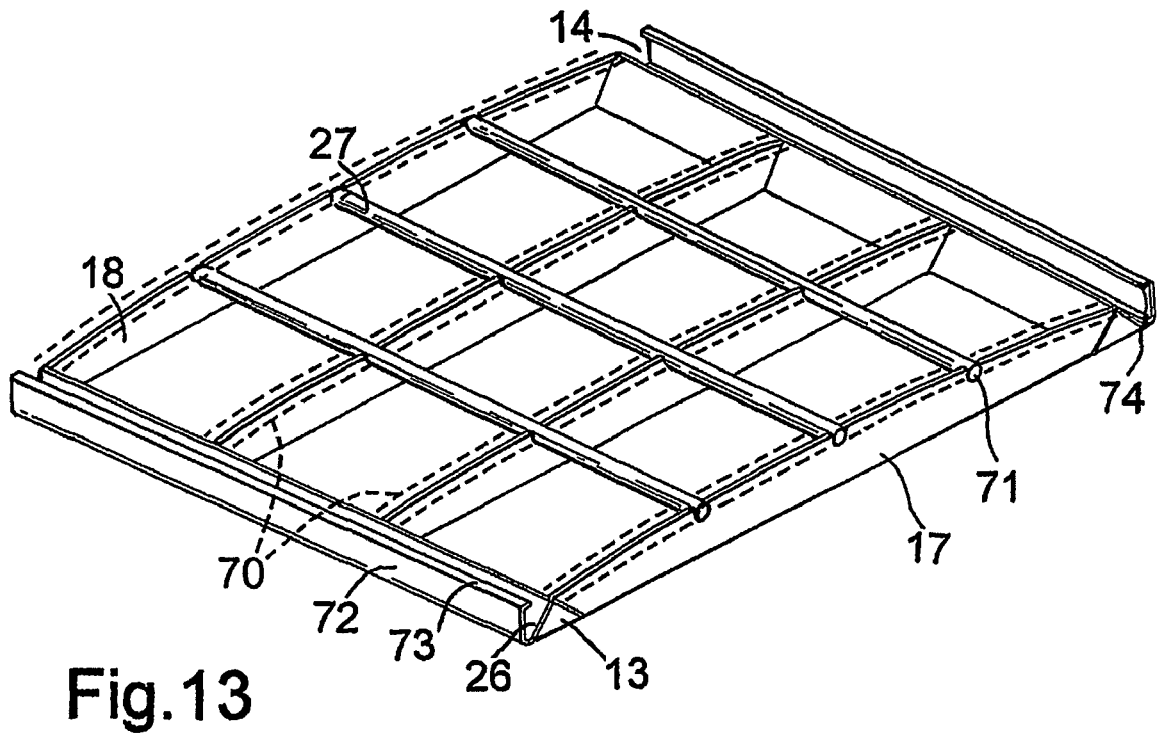
FIG. 13 is a perspective view of another support frame embodiment.
Figure 14:
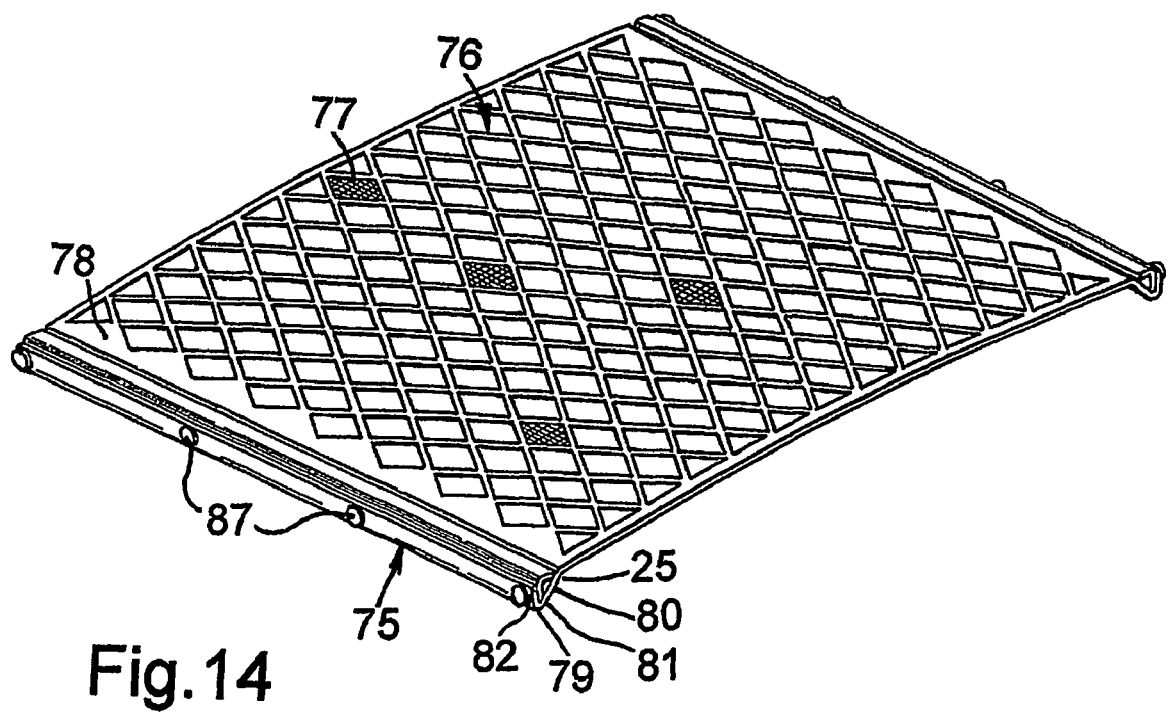
FIG. 14 is a perspective view of a screen element for use with the support frame of FIG. 13.
Figure 15:
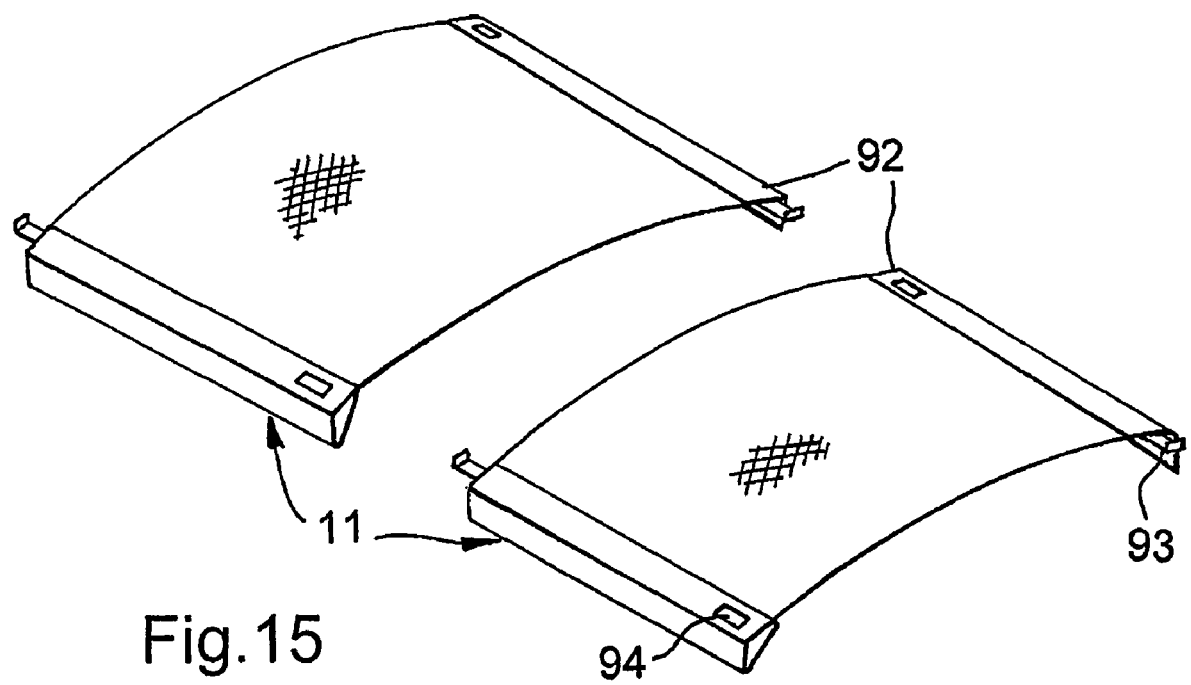
FIG. 15 is a perspective view of a multi-screen element interconnection system.

FIG. 13 shows a support frame generally similar to that of FIG. 3. In this case though the first and second frame elements 13, 14 are extended outwardly with an upwardly extending web 72 opposite the inclined face 26, which web 72 is turned back inwardly at its upper edge 73 to form a retaining flange 74. As an alternative to the mesh panel support tubes 27 extending parallel to the first and second frame elements 13, 14 there could be used mesh panel support tubes 70 extending parallel to the further (third and fourth) frame elements 17, 18 in order to elevate and tension the screen element when supported thereon.

It will be appreciated that various modifications of the above described embodiments may be made without departing from the scope of the present invention. Thus for example individual screen elements of the present invention could incorporate combinations of different ones of the above described support members at each end. Also the (or an outermost) support frame 12 may be provided on its third frame element 17 with an outwardly facing guide 88 (see FIG. 2), which directs the screen element 11 upwardly over and onto the top of the support frame 12 when the screen element 11 is fed into the runners 6 with a support frame 12 already in place therein.

Furthermore as shown in FIG. 4, the lower runners 89 could be downwardly inclined towards each other so that when correspondingly inclined engagement surfaces 90 at the underside 91 of the support frame 12 seat thereon, the support frame is automatically centralised in the runner supports of the screening apparatus.

Figure 16:
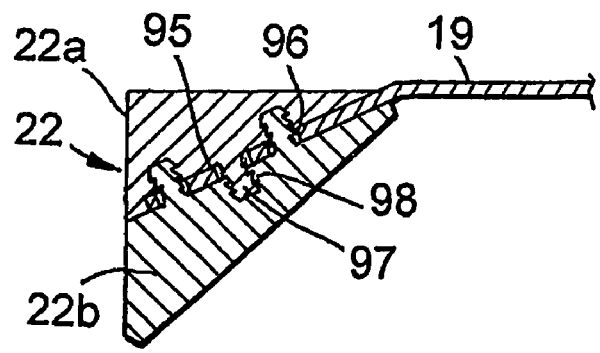
FIG. 16 is a detail sectional view showing arrangement for securing the support members to the mesh panel of a screen element.

As described above with reference to FIG. 2, each basket 5 has a series of screen systems 8 mounted thereover. Normally the support frames 12 remain in position in the apparatus 1 and only the screen elements 11 need to be removed and replaced. In order to facilitate this process, the screen elements 11 are provided at each corner 92 with respective ones of hook 93 and aperture 94 formations so that the screen elements 11 can be releasably interconnected together, as shown in FIG. 16.

Also in order to facilitate connection of the mesh panels 19 to the screen support members 22, there may be used support members in the form of two or more screen support member components 22a, 22b formed and arranged so as to snap fit together sandwiching the anchor portion edges 95 of the mesh panels 19 therebetween as illustrated in FIG. 17. In more detail, the anchor portion edges 95 are provided with apertures 96 through which project barbed studs 97 which engage in complementary sockets 98 for secure captive interengagement with each other.

It will be appreciated that various forms of arrangement can be used for supplying pressurized fluid, normally compressed gas, most conveniently compressed air, to the inflatable mesh panel support tubes 27. Conveniently the individual tubes 27 are connected 99 at one end 100 to a manifold 101 mounted on a frame element 18, as shown in FIG. 3. The manifold 101 has extending therefrom a flexible connecting hose 102 provided at its distal end 103 with a conventional compressed air coupling 104 which is connectable, in use of the apparatus, to a compressed air supply provided with control valves (not shown) for use in pressurizing and de-pressurizing the tubes 27 when installing and removing the screen elements 11.

The invention claimed is:

1. A screen system suitable for use in a vibratory screen apparatus provided with screen system support runners, said screen system comprising:
 a screen element consisting essentially of a mesh panel provided with first and second elongate support members extending along opposite end portions of said mesh panel; and
 a support frame for said screen element, said support frame having spaced apart first and second elongate frame elements for engagement with said screen element support members in use of the screen system, and farther elongate frame elements extending between said first and second frame elements for supporting said mesh panel of said screen element; said support frame being provided with at least one mesh panel support provided with an elevating support surface underneath said mesh panel in a position corresponding to an untensioned condition thereof, and formed and arranged so that elevation of said elevating support surface so as to displace said mesh panel above said position, tensions said screen element across said support surface and between said screen element support members, said screen element support members and said first and second frame elements being formed and arranged for secure interengagement in use of the screen system with at least one of said screen element support members and the respective one of said first and second frame elements being formed and arranged so that when said screen element is tensioned by said mesh panel support with said support surface thereof elevated, in use of the screen system, said mesh panel is securely held under tension and said screen element support members driven into securely gripped interengagement with said first and second frame elements, and wherein the screen element support members and respective one of the first and second frame elements, and said screen system support runners, are formed and arranged so that when the mesh panel is tensioned by the elevating surface of the mesh panel support, the screen element support members are driven into interengagement with both the respective one of the first and second frame elements and the screen system support runners, whereby the secure interengagement of the screen element support members and frame elements is dependent upon and achieved simultaneously with, the securing of the screen system in the apparatus on said runners.

2. The screen system as claimed in claim 1 wherein the first and second elongate support members of the screen element have a substantially unitary form.

3. The screen system as claimed in claim 2 wherein the first and second elongate support members of the screen element have a first, mesh engaging support member portion bonded to a second, gripping support member portion.

4. The screen system as claimed in claim 1 wherein the first and second elongate support members of the screen element comprise a first, mesh engaging support member portion, which is secured to a second, gripping support member portion using mechanical fastener elements.

5. The screen system as claimed claim 1 wherein both first and second elongate support members of the screen element and the respective elongate frame elements are formed and arranged for maximising gripping security when they are driven into interengagement with each other by the tensioning force applied to the mesh panel of the screen element by the elevation of the mesh panel support elevating surface.

6. The screen system as claimed in wherein only one of the first and second elongate support members of the screen element and the respective elongate frame element is formed and arranged for secure interengagement when driven into interengagement with each other through tensioning of the mesh panel of the screen element by the elevation of the mesh panel support elevating surface, and the other utilises a different form of secure interengagement.

7. The screen system as claimed in claim 6 wherein said other form of secure interengagement comprises at least one hook.

8. The screen system as claimed claim 1 further comprising a plurality of elongate mesh panel support members, spaced apart across the support frame.

9. The screen system as claimed in claim 8 further comprising a plurality of elongate mesh panel support members, extending transversely of the support frame parallel to said first and second elongate frame elements.

10. The screen system as claimed in claim 8 further comprising a plurality of mesh panel support members extending parallel to the further frame elements.

11. The screen system as claimed in claim 1 further comprising a lift mechanism for elevating the elevating surfaces of the elongate mesh panel support members, said lift mechanism being selected from a group consisting of: screw jack devices, camming devices, lever devices, and pressurised fluid lift devices.

12. The screen system as claimed in claim 11 further comprising an elevating device in the form of an expandable, fluid filled, tube, connectable, in use, to a pressurised fluid source, whereby introduction of the pressurised fluid will expand the tube so as to raise the elevating support surface provided thereon.

13. The screen system as claimed in claim 12 wherein the mesh panel support member comprises a collapsible tube filled with pressurized fluid.

14. The screen system as claimed in claim 12 wherein the elevating surface is formed by a flexible wall portion of the fluid filled tube on which the mesh panel is supported.

15. The screen system as claimed in claim 12 wherein the elevating surface is formed by a force transfer plate mounted on the tube.

16. The screen system as claimed in claim 15 wherein said force transfer plate has a mesh panel support surface lining which is resiliently deformable to a limited extent so as to minimise local stresses on the mesh panel and minimise relative movement between the mesh panel and the mesh panel support, in use of the vibratory screen apparatus.

17. A stand alone screen system suitable for use in a vibratory screen apparatus, said screen system comprising:

a screen element consisting essentially of a mesh panel provided with first and second elongate support members extending along opposite end portions of said mesh panel; and a support frame for said screen element, said support frame having spaced apart first and second elongate frame elements for engagement with said screen element support members in use of the screen system, and further elongate frame elements extending between said first and second frame elements for supporting said mesh panel of said screen element; said support frame being provided with at least one mesh panel support provided with an elevating support surface, and formed and arranged so that elevation of said elevating support surface relative to said support frame, tensions said screen element across said support surface and between said screen element support members, said first and second screen element support members and said first and second frame elements being formed and arranged for secure interengagement in use of the screen system, with at least one of said screen element support members and the respective one of said first and second frame elements being formed and arranged so that when said screen element is tensioned by said mesh panel support with said support surface thereof elevated, in use of the screen system, said mesh panel is securely held under tension and said screen element support members driven into securely gripped interengagement with said frame elements, said at least one screen element support members and respective one of the first and second frame elements are being formed and arranged so that when the former is driven into interengagement with the latter by the tensioning of the mesh panel of the screen element, they are captively interengaged with each other whereby the screen element and the support frame form together a securely interengaged stand-alone screen system unit.

18. A method of mounting a screen element in a vibratory screen apparatus which has a basket provided with screen system support runners formed and arranged for sliding insertion and removal of a screen system; said screen system comprising a screen element consisting essentially of a mesh panel provided with first and second elongate support members extending along opposite end portions of said mesh panel; and a support frame for said screen element, said support frame having spaced apart first and second elongate frame elements for engagement with said screen element support members in use of the screen system, and further elongate frame elements extending between said first and second frame elements for supporting said mesh panel of said screen element; said support frame being provided with at least one mesh panel support provided with an elevating support surface underneath said mesh panel in a position corresponding to an untensioned condition thereof, and formed and arranged so that elevation of said elevating support surface so as to displace said mesh panel above said position, tensions said screen element across said support surface and between said screen element support members, said screen element support members and said first and second frame elements being formed and arranged for secure interengagement in use of the screen system, with at least one of said screen element support members and the respective one of said first and second frame elements being formed and arranged so that when said screen element is tensioned by said mesh panel support with said support surface thereof elevated, in use of the screen system, said mesh panel is securely held under tension and said screen element support members driven into securely gripped interengagement with said first and second frame elements; the method comprising the steps of inserting a said screen element into said basket so as to be supported on a said support frame in said support runners; and elevating said mesh panel support surface so as tension said screen element, thereby driving said screen element support members so as to simultaneously grip said screen element securely together with said support frame in said support runners.

19. The A screen system as claimed in claim 12 wherein the elevating surface is formed.

* * * * *